(12) United States Patent
Vega et al.

(10) Patent No.: US 8,271,976 B2
(45) Date of Patent: Sep. 18, 2012

(54) SYSTEMS AND METHODS FOR INITIALIZING MULTIPLE VIRTUAL PROCESSORS WITHIN A SINGLE VIRTUAL MACHINE

(75) Inventors: Rene Antonio Vega, Kirkland, WA (US); Eric P. Traut, Bellevue, WA (US); Mike Neil, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1917 days.

(21) Appl. No.: 10/882,967

(22) Filed: Jun. 30, 2004

(65) Prior Publication Data

US 2006/0005188 A1    Jan. 5, 2006

(51) Int. Cl.
*G06F 9/455* (2006.01)
*G06F 9/46* (2006.01)

(52) U.S. Cl. .............................. 718/1; 718/103; 718/104

(58) Field of Classification Search .............. 718/1, 104
See application file for complete search history.

(56) References Cited

U.S. PATENT DOCUMENTS

| | | | |
|---|---|---|---|
| 4,779,188 A | 10/1988 | Gum et al. | |
| 4,843,541 A | 6/1989 | Bean et al. | |
| 4,875,186 A | 10/1989 | Blume, Jr. | |
| 5,063,499 A | 11/1991 | Garber | |
| 5,095,427 A * | 3/1992 | Tanaka et al. | 718/1 |
| 5,278,973 A | 1/1994 | O'Brien et al. | |
| 5,301,277 A | 4/1994 | Kanai | |
| 5,367,628 A | 11/1994 | Ote et al. | |
| 5,406,644 A | 4/1995 | MacGregor | |
| 5,448,264 A | 9/1995 | Pinedo et al. | |
| 5,452,456 A | 9/1995 | Mourey et al. | |
| 5,502,809 A | 3/1996 | Takano | |
| 5,530,860 A * | 6/1996 | Matsuura | 718/105 |
| 5,541,862 A | 7/1996 | Bright et al. | |
| 5,640,562 A | 6/1997 | Wold et al. | |
| 5,666,521 A | 9/1997 | Marisetty | |
| 5,742,797 A | 4/1998 | Celi, Jr. et al. | |
| 5,752,275 A | 5/1998 | Hammond | |

(Continued)

FOREIGN PATENT DOCUMENTS

DE    42 17 444    12/1992

(Continued)

OTHER PUBLICATIONS

Goldberg, R. P., "Survey of Virtual Machine Research," IEEE Service Center, 1974, 7(6), XP009043730A, pp. 34-45.

(Continued)

*Primary Examiner* — Camquy Truong
(74) *Attorney, Agent, or Firm* — Woodcock Washburn LLP

(57) ABSTRACT

The present invention is a system for and method of initializing multiple virtual processors in a virtual machine (VM) environment. The method of initializing multiple virtual processors includes the steps of the host creating a multiple processor VM and activating a "starter virtual processor," the "starter virtual processor" issuing a startup command to a next virtual processor, the virtual machine monitor (VMM) giving the target virtual processor the highest priority for accessing the hardware resources, the VMM forcing the "starter virtual processor" to relinquish control of the hardware resources, the VMM handing control of the hardware resources to the target virtual processor, the target virtual processor executing and completing its startup routine, the VMM forcing the target virtual processor to relinquish control of the hardware resources, and the VMM handing control of the hardware resources back to the "starter virtual processor" for activating subsequent virtual processors.

28 Claims, 6 Drawing Sheets

U.S. PATENT DOCUMENTS

| | | | |
|---|---|---|---|
| 5,757,386 | A | 5/1998 | Celi, Jr. et al. |
| 5,790,825 | A | 8/1998 | Traut |
| 5,815,686 | A | 9/1998 | Earl et al. |
| 5,831,607 | A | 11/1998 | Brooks |
| 5,860,147 | A | 1/1999 | Gochman et al. |
| 5,928,322 | A * | 7/1999 | Bitar et al. ............... 718/103 |
| 5,940,872 | A | 8/1999 | Hammond et al. |
| 6,014,170 | A | 1/2000 | Pont et al. |
| 6,026,476 | A | 2/2000 | Rosen |
| 6,058,466 | A * | 5/2000 | Panwar et al. ................ 712/15 |
| 6,067,618 | A | 5/2000 | Weber |
| 6,075,938 | A | 6/2000 | Bugnion et al. ............ 703/27 |
| 6,199,176 | B1 | 3/2001 | Greenstein et al. |
| 6,269,391 | B1 | 7/2001 | Gillespie ............... 718/100 |
| 6,298,370 | B1 | 10/2001 | Tang et al. |
| 6,496,847 | B1 | 12/2002 | Bugnion et al. |
| 6,651,132 | B1 | 11/2003 | Traut |
| 6,668,287 | B1 | 12/2003 | Boyle et al. |
| 6,681,238 | B1 | 1/2004 | Brice et al. |
| 6,795,966 | B1 * | 9/2004 | Lim et al. ........................ 718/1 |
| 6,980,946 | B2 | 12/2005 | Giles et al. |
| 7,069,205 | B1 | 6/2006 | Carrolle et al. |
| 7,085,705 | B2 | 8/2006 | Traut |
| 7,158,927 | B2 | 1/2007 | Traut |
| 7,225,119 | B2 | 5/2007 | Traut |
| 7,275,028 | B2 | 9/2007 | Traut |
| 7,506,265 | B1 | 3/2009 | Traut et al. |
| 2002/0083369 | A1 | 6/2002 | Schelling ...................... 714/36 |
| 2003/0055864 | A1 * | 3/2003 | Armstrong et al. ........... 709/107 |
| 2003/0110173 | A1 | 6/2003 | Marsland ..................... 707/10 |
| 2003/0188165 | A1 | 10/2003 | Sutton et al. ................ 713/176 |
| 2004/0268108 | A1 * | 12/2004 | Chen et al. ........................ 713/1 |
| 2005/0060704 | A1 * | 3/2005 | Bulson et al. ................... 718/1 |

FOREIGN PATENT DOCUMENTS

| | | |
|---|---|---|
| EP | 0 524 773 | 7/1992 |
| EP | 0 645 701 | 9/1994 |
| EP | 1 031 924 | 8/2000 |
| FR | 2 587 519 | 3/1987 |
| JP | 4-213733 A | 8/1992 |
| JP | 6-103092 A | 4/1994 |
| JP | 6-242975 A | 9/1994 |
| JP | 7-271738 A | 10/1995 |
| JP | 2000-132530 A | 5/2000 |
| JP | 2000-242512 A | 9/2000 |
| WO | WO 98/57262 | 12/1998 |

OTHER PUBLICATIONS

PCT International Search Report in International Application No. PCT/US 01/22276, International filed Jul. 16, 2001, mail date Jul. 3, 2000.

Traut E, "Building the Virtual PC," *Byte*, McGraw-Hill Inc., vol. 22, No. 11, pp. 51-52, Nov. 1, 1997.

"Intel386 DX Microprocessor," *Intel*, pp. 32-58, Dec. 31, 1995.

"MacIntosh and Technology: Changing Chips in the Middle of the Stream, or Apple Takes a Risc," btech.co/changingchips.html, paragraphs '00061!-'00071!, retrieved Dec. 10, 2001.

"M68040 User's Manual," Motorola, Inc., Chapter 3, copyright 1990, revised 1992, 1993.

Osisek DL et al., "ESA/390 Interpretive-Execution Architecture, Foundation for VM/ESA," *IBM Systems Journal*, vol. 30, No. 1, pp. 34-51, 1991.

Shang Rong Tsai et al., On the Architectural Support for Logical Machine Systems, *Microprocessing and Microprogramming*, vol. 22, No. 2, pp. 81-96, Feb. 1988.

PCT International Search Report in International Application No. PCT/US 01/22277, International filed Jul. 16, 2001, mail date Feb. 7, 2002.

"Processor Instruction Sets," The PC Guide, version date Apr. 17, 2001, pcguide.com/ref/cpu/arch/int/inst-c.html.

"M68060 User's Manual," Motorola, 1994, pp. i-xviii; Section 4, Memory Management Unit, pp. 4-1 to 4-30, e-.motorola.com/brdata/ PDFDB/MICROPROCESSORS/32_BIT/68K-COLDFIRE/ M680X0/MC68060UM.pdf.

"MPC750, RISC Microprocessor Users Manual," Motorola, Aug. 1997, Contents, pp. iii-xvi; Chapter 5, Memory Management, pp. 5-1 to 5-34; Glossary, pp. Glossary-1 to Glossary13, e-.motorola.com/ brdata/PDFDB/MICROPROCESSORS/32_BIT/POWERPC/ MPC7XX/MPC750UM.pdf.

Mitchem et al., "Using Kerna Hypervisors to Secure Applications" IEEE Dec. 1997, pp. 175-181.

Bressoud-T.C. "Hypervisor-Based Fault-Tolerance" ACM, vol. 14, No. 1, Feb. 1996, pp. 90-107.

Bershad et al., "Avoiding Conflict Misses Dynamically in Large Direct-Mapped Caches" 1994 ACM pp. 158-170.

Young-C.J., "Extended Architecture and Hypervisor Performance" 1973. IBM pp. 177-183.

* cited by examiner

SYSTEMS AND METHODS FOR INITIALIZING MULTIPLE VIRTUAL PROCESSORS WITHIN A SINGLE VIRTUAL MACHINE

CROSS-REFERENCE

This application is related by subject matter to the invention disclosed in the following patent: U.S. Pat. No. 7,085,705, issued on Aug. 1, 2006 and entitled, "SYSTEM AND METHOD FOR THE LOGICAL SUBSTITUTION OF PROCESSOR CONTROL IN AN EMULATED COMPUTING ENVIRONMENT," the entirety of said patent applications being hereby incorporated herein by reference.

FIELD OF THE INVENTION

The present invention generally relates to the field of virtual machines (also known as "processor virtualization") and software that executes in a virtual machine environment. More specifically, the present invention is directed to a system for and method of initializing multiple virtual processors (VPs) within a single virtual machine.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

In "real" physical/non-virtual computing environments, computing systems exist that include multiple physical processors within the computer hardware. Generally, the initial state of a multi-processor system is such that one processor serves as a "starter processor" that transmits startup messages to each of the other processors present in the system. More specifically, coded in the BIOS or the OS, communication to a local advanced programmable interrupt controller (APIC)

device occurs to direct startup messages from the starter processor to each of the processors present. (A local APIC device handles interrupts from and for multiple processors.) Initially there is a master-slave relationship between the starter processor and all other processors, but once all processors are started, the processors run at a peer level. The mechanism for starting a processor is very loosely defined in the x86 architecture. There is a message to start a processor, but there is no defined architectural means to indicate to the starter processor whether the target processor is successfully started. Given this, the conventional mechanism that is used for determining whether the target processor is successfully started is the basic input/output system (BIOS), which is the very first piece of software which runs when a computer is switched on. To begin, BIOS code executing on the starter processor issues a start message to another processor, known as the target processor, indicating at which shared memory location it should begin startup program execution. Then, execution of startup program code that is left in shared memory is begun by the target processor, and the target processor sets a flag. The OS of the starter processor looks for a change in that location in memory. When the BIOS code of the starter processor detects that the shared memory location has changed, it knows that the target processor has started. The only indication to the starter BIOS code that the target processor did not start is when the code does not detect a change in memory location within a limited amount of time and, thus, assumes that there is a problem with the processor and, therefore, it is not available. This timeout period is short—a few milliseconds.

Currently, most VMs generally use a single virtual processor (VP), but a multi-processor VM (MPVM) may be desirable. In a VM environment, one way to initialize multiple VPs is for the VMM to create emulate multiple VPs is through multiple threads of execution on the host computer system. However, because these VPs correspond to separate threads of execution in the host environment, and because there may be multiple VMs in a system vying for limited system resources, the execution time for a thread that represents a VP is arbitrary because of time-slicing. Therefore, upon initialization, it is expected that a given VP may not start immediately. However, the guest operating system (and, more specifically, the BIOS that are part of an operating system) were developed on the presumption that it would be executing on physical hardware with real multiple processors and a very quick startup time for a real processor, and thus the guest OS provides only a small finite amount of real time for an initialized processor to actually start before timing out which is adequate for real processor hardware. However, this is somewhat problematic in a virtualized environment since initialization and startup of a VP may take several milliseconds (due to thread executing and such) and, in fact, the time it takes to start a VP will almost always exceed the timeout of the guest OS. One simple and direct way to handle the timeout problem is to modify the BIOS of the guest OS in order to lengthen the timeout, but this solution requires that all guest OSs be maintained (i.e., their timeouts all have to be modified), and this in turn comprises one of the benefits of a VM—that is, the ability to run an off-the-shelf operating system (presumably developed for real hardware). Moreover, the need to do this maintenance—such as on a case-by-case and OS-by-OS basis—is also problematic because of the risk of failure if the maintenance is not applied properly. Therefore, what is needed is a way to initialize multiple VPs in a VM environment without timing out and without the need to modify and maintain each guest OS and/or its associated components, such as the BIOS.

SUMMARY OF THE INVENTION

The present invention is a system for and method of initializing multiple virtual processors in a VM environment. In order to prevent a timeout condition in the guest OS on initialization, the multi-processor VM system and method of the present invention provide a way of initializing multiple virtual processors within a VM environment without the need to modify and maintain each guest OS and/or its associated components, such as the BIOS, which thereby provides greater efficiency in a VM environment.

The method of initializing multiple virtual processors includes the steps of the host creating a multiple processor VM and activating a "starter virtual processor," the "starter virtual processor" issuing a startup command to a next virtual processor, the virtual machine monitor (VMM) giving the target virtual processor the highest priority for accessing the hardware resources, the VMM forcing the "starter virtual processor" to relinquish control of the hardware resources, the VMM handing control of the hardware resources to the target virtual processor, the target virtual processor executing and completing its startup routine, the VMM forcing the target virtual processor to relinquish control of the hardware resources, and the VMM handing control of the hardware resources back to the "starter virtual processor" for activating subsequent virtual processors.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
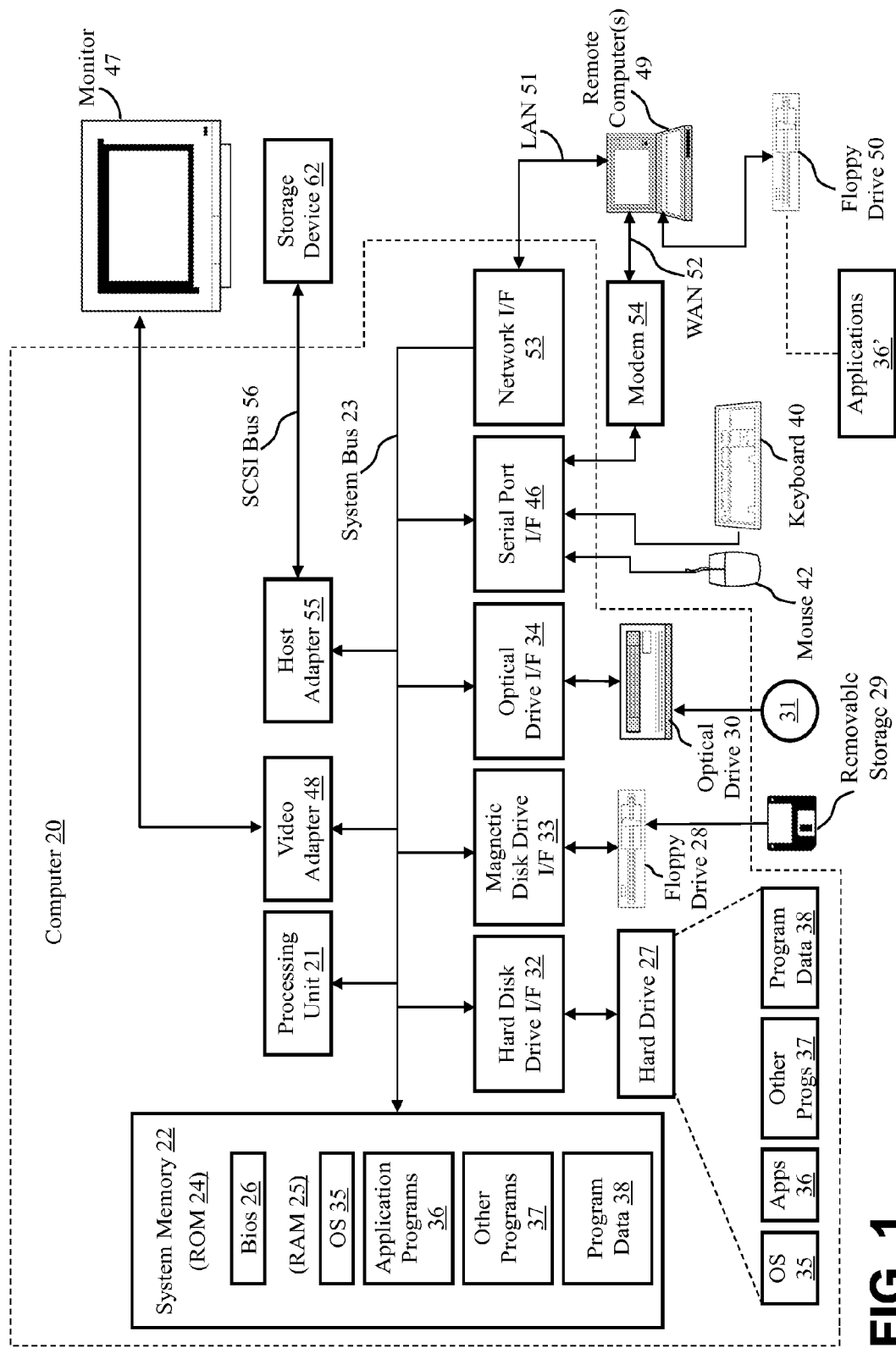
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
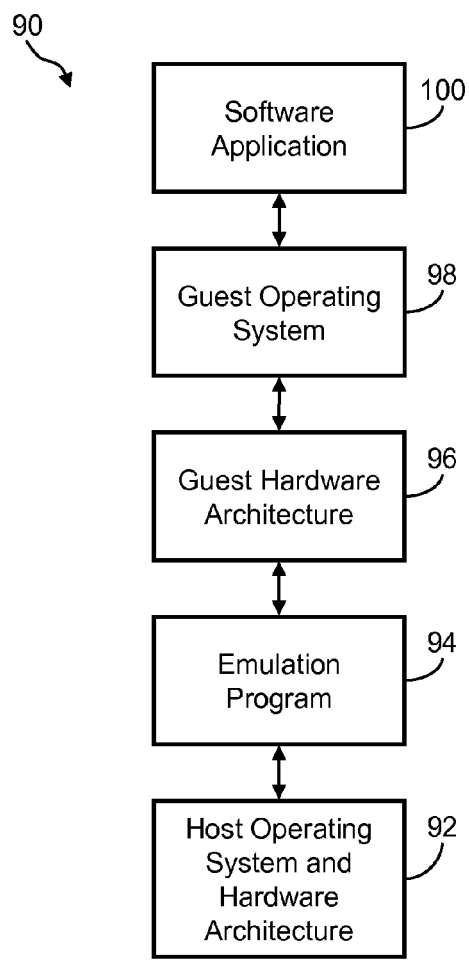
FIG. 2 illustrates the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3A:
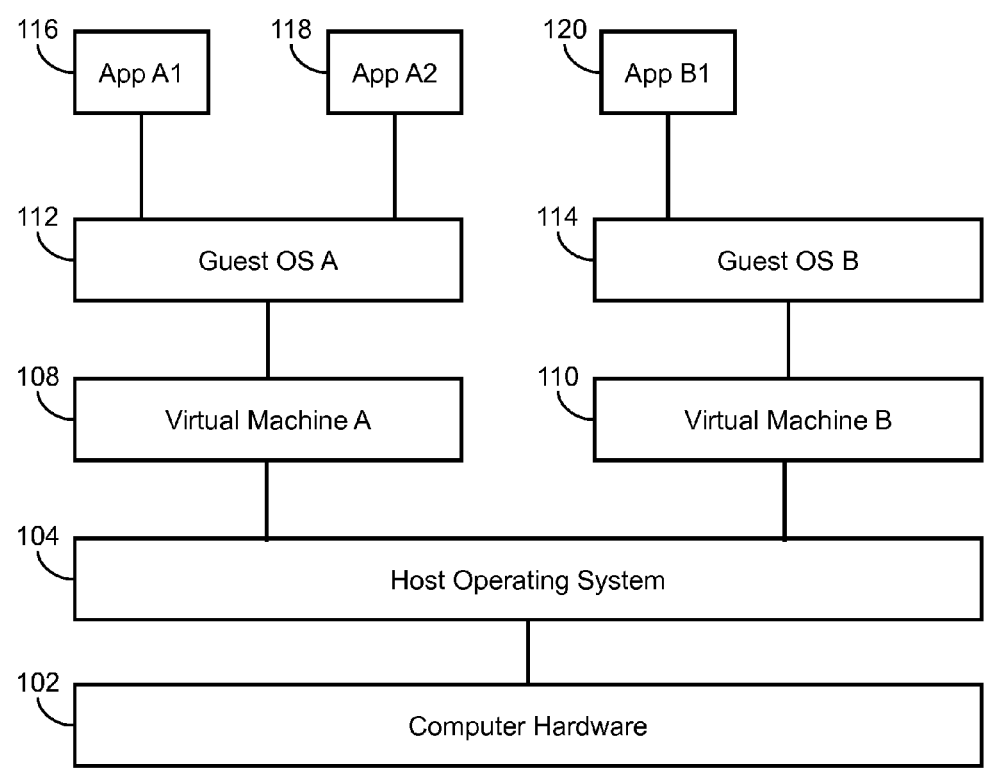
FIG. 3A illustrates a virtualized computing system.

FIG. 3A illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

Figure 3B:
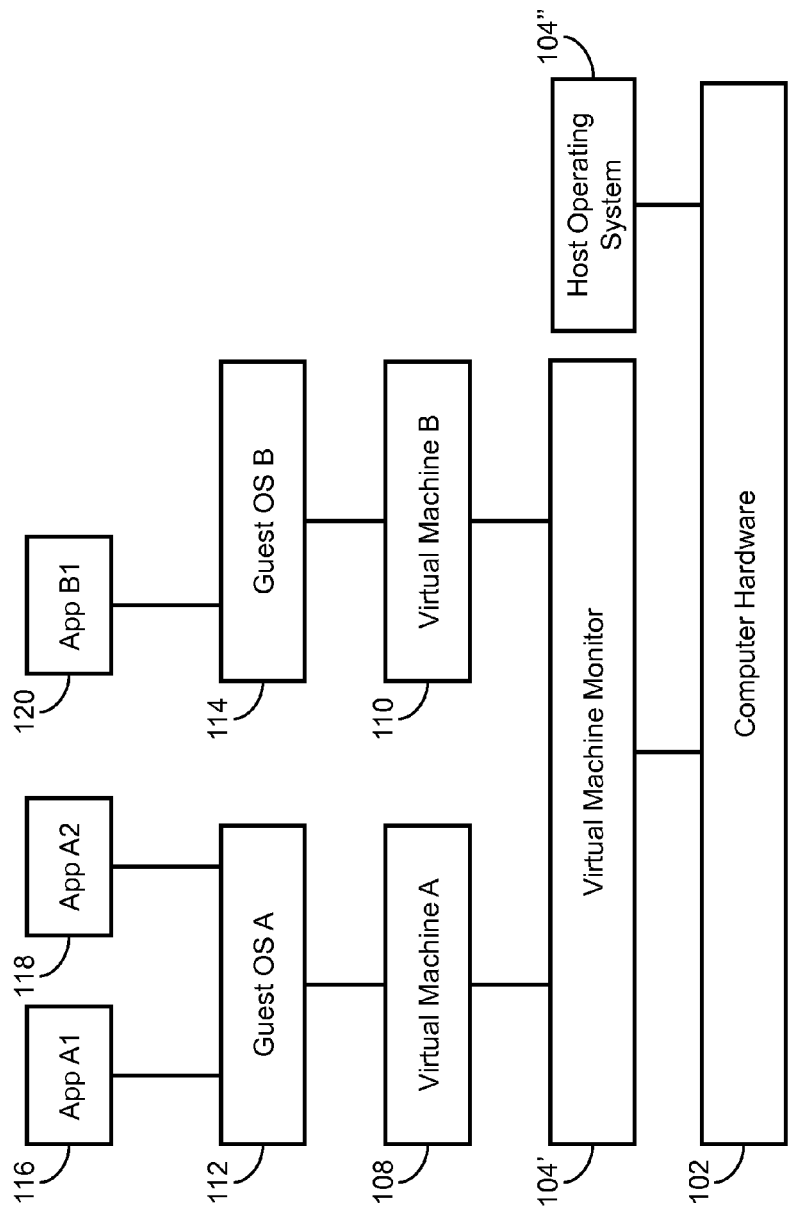
FIG. 3B illustrates an alternative embodiment of a virtualized computing system comprising a virtual machine monitor running alongside a host operating system.

Alternately, a virtual machine monitor, or VMM, software layer 104' may be running in place of or alongside a host operating system 104", the latter option being illustrated in FIG. 3B. For simplicity, all discussion hereinafter (specifically regarding the host operating system 104) shall be directed to the embodiment illustrated in FIG. 3A; however, every aspect of such discussion shall equally apply to the embodiment of FIG. 3B wherein the VMM 104' of FIG. 3B essentially replaces, on a functional level, the role of the host operating system 104 of FIG. 3A described herein below.

Referring again to FIG. 3A, above the host OS 104 (or VMM 104') are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSs) A 112 and B 114 respectively. Above guest OS A 112 are running two applications, application A1 116 and application A2 118, and above guest OS B 114 is application B1 120.

Initiating Multiple Virtual Processors

Figure 4:
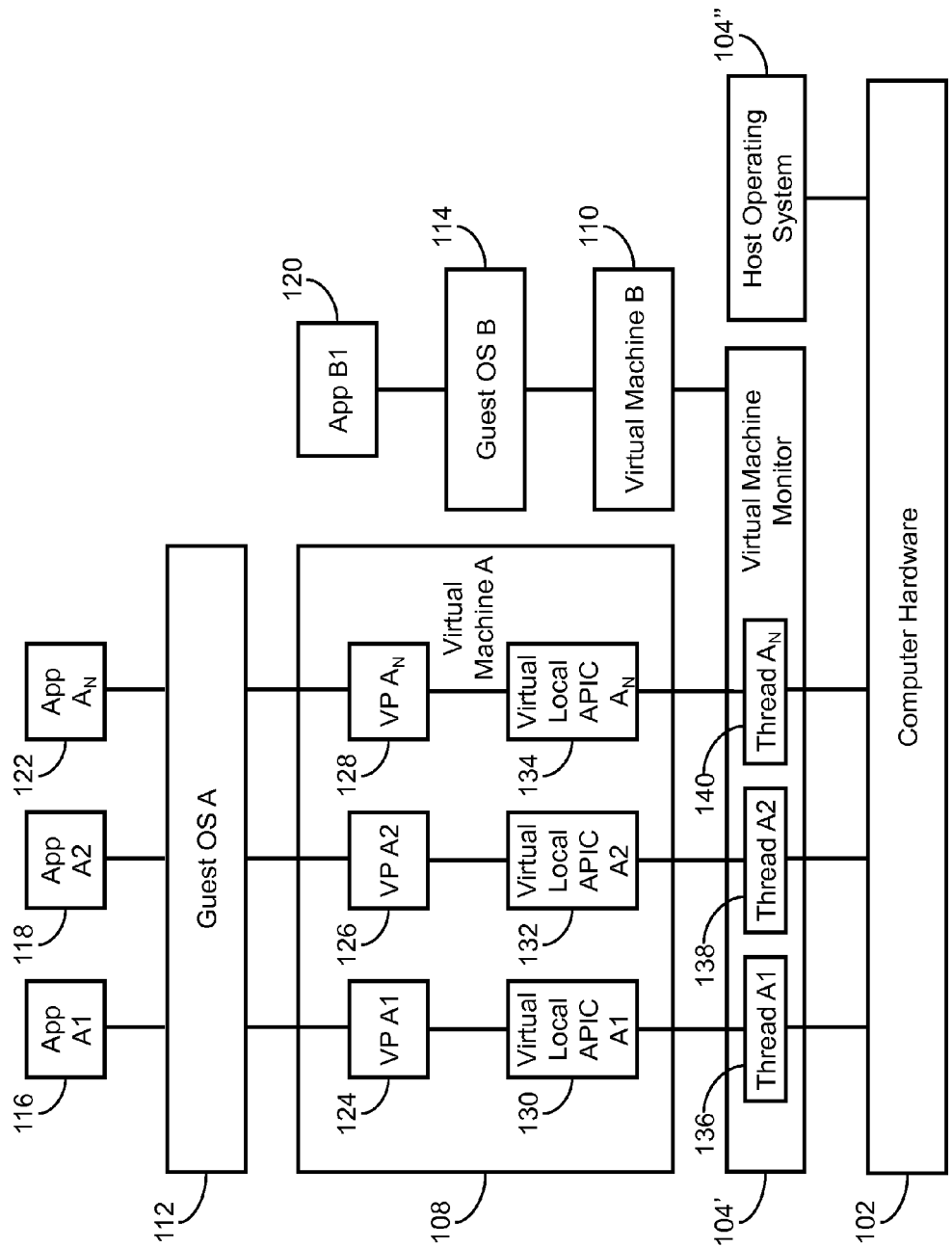
FIG. 4 illustrates portions of the system of FIG. 3B that further comprises a plurality of virtual processors.

FIG. 4 illustrates portions of the system of FIG. 3B that further comprises a plurality of virtual processors (VPs). As known and understood by those of skill in the art, a VP is a virtualized device, logically equivalent to a physical processor, that a virtual machine emulates for a guest operating system. In the multi-processor VM system of FIG. 4, VM A 108 comprises a VP A1 124, a VP A2 126, through a VP $A_N$ 128 which, for example, VM A 108 may emulate for guest OS A 112 for executing, for example, application A1 116, application A2 118, through an application $A_N$ 122, respectively. Additionally, each VP has an associated virtual local APIC, which handles the process whereby one processor can interrupt another processor and which also enables one processor to start another, as is well known. When accessed by a processor, the local APIC device performs actions, such as masking interrupts, enabling interrupts, or generating an inter-processor interrupt. More specifically, in the multi-processor VM system of FIG. 4, VM A 108 further comprises a virtual local APIC A1 130 associated with VP A1 124, a virtual local APIC A2 132 associated with VP A2 126, and a virtual local APIC $A_N$ 134 associated with VP $A_N$ 128. Likewise, VM B 110 may include a plurality of VPs and virtual local APIC devices, but for simplicity, these are not shown.

Each VP has its own thread of execution in the VMM, as is well known. A thread is a self-contained process associated with a specific program or application that runs on a processor. The processor runs programs or applications seemingly in parallel, but in practice, the processor is time-slicing between threads, based upon priority. As a result and with continuing reference to FIG. 4, VMM 104' further comprises a thread A1 136 associated with VP A1 124 and a thread A2 138 associated with VP A2 126 through a thread $A_N$ 140 associated with VP $A_N$ 128. Each thread running concurrently is assigned a priority for accessing the hardware resources (i.e., computer hardware 102) in accordance with whatever VMM 104' allots to each thread, i.e., time-slicing.

In order to prevent a timeout condition in the guest OS upon initialization, the multi-processor VM system of the present invention, as shown in FIG. 4, provides a way of initializing multiple virtual processors within a VM environment without the need to modify and maintain each guest OS and/or its associated components, such as the BIOS. A method of initializing a multiple processor VM is found in more detail in reference to FIG. 5.

Figure 5:
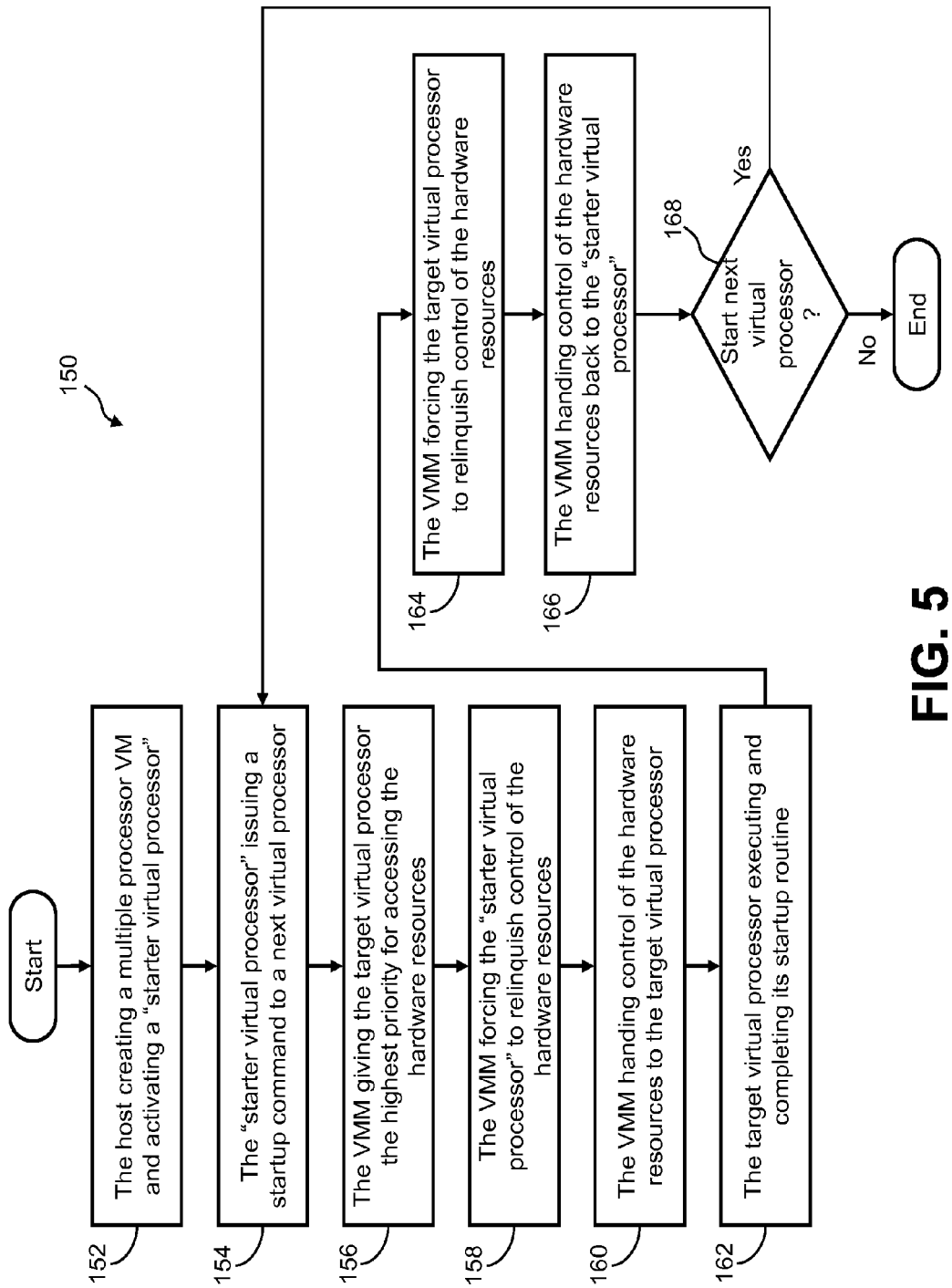
FIG. 5 is a flowchart that illustrates a method of initializing a multiple processor VM in accordance with the invention.

FIG. 5 is a flowchart that illustrates a method 150 of initializing a multiple processor VM in accordance with the invention and with continuing reference to FIG. 4. At step 152, host OS 104" creates a multiple processor VM, such as VM A 108 as shown in FIG. 4, and activates a "starter virtual processor," for example, activating VP A1 124 as the "starter virtual processor." At step 154, VP A1 124, which is the "starter virtual processor" in this example, issues a startup command to a next virtual processor, such as one of virtual processors VP A2 126 through VP $A_N$ 128.

At step 156, VMM 104' gives the thread associated with the target virtual processor, such as one of threads A2 138 through $A_N$ 140 of virtual processors VP A2 126 through VP $A_N$ 128, respectively, the highest priority for accessing the hardware resources, i.e., computer hardware 102, which includes one or more physical processors (not shown). At step 158, VMM 104' forces thread A1 136, which is associated with VP A1 124, to relinquish control of the hardware resources, i.e., computer hardware 102. At step 160, VMM 104' hands control of the hardware resources to the thread associated with target virtual processor, such as one of threads A2 138 through $A_N$ 140 of virtual processors VP A2 126 through VP $A_N$ 128, respectively.

At step 162, the thread associated with the target virtual processor, such as one of threads A2 138 through $A_N$ 140 of virtual processors VP A2 126 through VP $A_N$ 128, respectively, executes and completes its startup routine. At step 164, VMM 104' forces the thread associated with target virtual processor, such as one of threads A2 138 through $A_N$ 140 of virtual processors VP A2 126 through VP $A_N$ 128, respectively, to relinquish control of the hardware resources, i.e., computer hardware 102. At step 166, VMM 104' hands control of the hardware resources back to thread A1 136, which is associated with VP A1 124, which is the "starter virtual processor."

At decision step 168, VMM 104' determines whether there are any virtual processors remaining to initialize. If yes, method 150 returns to step 154; if not, method 150 ends.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for starting up a virtual machine, said virtual machine emulating a multi-processor computing device, said emulation comprising an emulation of a first virtual processor corresponding to one processor of the multi-processor computing device and an emulation of a second virtual processor corresponding to another processor of the multi-processor computing device, said method comprising:
    generating an initial state of said virtual machine having a guest operating system executing on the first virtual processor corresponding to a first thread of execution,
    issuing a startup command by the first virtual processor to the second virtual processor corresponding to a second thread of execution;
    providing said second virtual processor and its corresponding second thread of execution with the highest priority for utilizing hardware resources so that the second virtual processor can begin a startup in response to receiving the startup command issued by the first virtual processor;
    forcing the first virtual processor and its corresponding first thread of execution to relinquish control of at least one hardware resource and providing control to the at least one hardware resource to the second virtual processor and its corresponding second thread of execution;
    said second virtual processor and its corresponding second thread of execution completing the startup.

2. The method of claim 1 further comprising, after said second virtual processor and its corresponding second thread of execution completing a startup, providing said second virtual processor and its corresponding second thread of execution with a priority other than the highest priority for utilizing hardware resources.

3. The method of claim 1 further comprising forcing said second virtual processor and its corresponding second thread of execution to relinquish control of at least one hardware resource and providing control to same to said first virtual processor and its corresponding first thread of execution.

4. A method for starting a second virtual processor in a virtual machine environment, said virtual machine environment comprising a guest operating system executing on said virtual machine emulated by a virtual machine monitor, said virtual machine comprising a plurality of virtual processors which are implemented as separate threads of execution, said method comprising:
    said guest operating system executing on a first virtual processor corresponding to a first thread of execution, and said guest operating system issuing a startup command to start the second virtual processor via said first virtual processor, the second virtual processor corresponding to a second thread of execution;
    said virtual machine monitor providing said second virtual processor and its corresponding second thread of execution with the highest priority for utilizing hardware resources, thereby preventing said first thread of execution corresponding to said guest operating system from continuing execution and thus preventing a timeout corresponding to said startup command;
    said virtual machine monitor forcing said first virtual processor and its corresponding first thread of execution to relinquish control of a set of all hardware resources and providing control to the set of all hardware resources to said second virtual processor and its corresponding second thread of execution;

in response to receiving the startup command from the first virtual processor, said second virtual processor and its corresponding second thread of execution completing a startup;

said virtual machine monitor providing said second virtual processor and its corresponding second thread of execution with a priority other than the highest priority for utilizing hardware resources; and said virtual machine monitor forcing said second virtual processor and its corresponding second thread of execution to relinquish control of said set of all hardware resources and providing control to said set of all hardware resources to said first virtual processor and its corresponding first thread of execution.

5. The method of claim 4 wherein said virtual machine monitor is a component part of a host operating system.

6. The method of claim 4 wherein said first thread of execution and said second thread of execution are both executed on a first physical processor.

7. The method of claim 4 wherein said first thread of execution is executed on a first physical processor, and said second thread of execution is executed on a second physical processor, said method further comprising:

suspending execution of said first operating system substantially concurrent with the element of providing said second virtual processor and its corresponding second thread of execution with the highest priority for utilizing hardware resources; and continuing execution of said second operating system substantially concurrent with the element of said virtual machine monitor providing said second virtual processor and its corresponding second thread of execution with a priority other than the highest priority for utilizing hardware resources.

8. A system for starting a virtual machine, said virtual machine emulating a multi-processor computing device, said virtual machine comprising a guest operating system executing on a first virtual processor corresponding to a first thread of execution, said first virtual processor corresponding to an emulation of one processor of the multi-processor computing device, said system comprising:

at least one computing device having at least one memory storing instructions that upon execution on the at least one computing device, cause the system to:

issue a startup command to a second virtual processor emulated in the same virtual machine and corresponding to a second thread of execution;

provide said second virtual processor and its corresponding second thread of execution with the highest priority for utilizing hardware resources;

force the first virtual processor and its corresponding first thread of execution to relinquish control of at least one hardware resource and provide control to the at least one hardware resource to the second virtual processor and its corresponding second thread of execution;

in response to receiving the startup command, said second virtual processor and its corresponding second thread of execution complete a startup.

9. The system of claim 8 further comprising at least one subsystem for, after said second virtual processor and its corresponding second thread of execution completing a startup, providing said second virtual processor and its corresponding second thread of execution with a priority other than the highest priority for utilizing hardware resources.

10. The system of claim 8 further comprising at least one subsystem for forcing said second virtual processor and its corresponding second thread of execution to relinquish control of at least one hardware resource and providing control to same to said first virtual processor and its corresponding first thread of execution.

11. A system for starting a second virtual processor in a virtual machine environment, said virtual machine environment comprising a guest operating system executing on said virtual machine emulated by a virtual machine monitor, said virtual machine comprising a plurality of virtual processors which are implemented as separate threads of execution, said system comprising:

at least one computing device having at least one memory storing instructions that upon execution on the at least one computing device, at least cause:

said guest operating system, to execute on a first virtual processor corresponding to a first thread of execution, issuing a startup command to start the second virtual processor via said first virtual processor, the second virtual processor corresponding to a second thread of execution;

said virtual machine monitor to provide said second virtual processor and its corresponding second thread of execution with the highest priority for utilizing hardware resources, thereby preventing said first thread of execution corresponding to said guest operating system from continuing execution and thus preventing a timeout corresponding to said startup command;

said virtual machine monitor to force said first virtual processor and its corresponding first thread of execution to relinquish control of a set of all hardware resources and providing control to the set of all hardware resources to said second virtual processor and its corresponding second thread of execution;

in response to receiving the startup command from the first virtual processor, said second virtual processor and its corresponding second thread of execution to complete a startup;

said virtual machine monitor to provide said second virtual processor and its corresponding second thread of execution with a priority other than the highest priority for utilizing hardware resources; and said virtual machine monitor to force said second virtual processor and its corresponding second thread of execution to relinquish control of said set of all hardware resources and providing control to said set of all hardware resources to said first virtual processor and its corresponding first thread of execution.

12. The system of claim 11 further comprising at least one subsystem whereby said virtual machine monitor is a component part of a host operating system.

13. The system of claim 11 further comprising at least one subsystem whereby said first thread of execution and said second thread of execution are both executed on a first physical processor.

14. The system of claim 11 further comprising at least one subsystem whereby said first thread of execution is executed on a first physical processor, and said second thread of execution is executed on a second physical processor, and further comprising at least one subsystem for:

suspending execution of said first operating system substantially concurrent with the element of providing said second virtual processor and its corresponding second thread of execution with the highest priority for utilizing hardware resources; and continuing execution of said second operating system substantially concurrent with the element of said virtual machine monitor providing said second virtual processor and its corresponding second thread of execution with a priority other than the highest priority for utilizing hardware resources.

15. A computer-readable storage medium comprising computer-readable instructions for starting a virtual machine emulated by an emulator program, said virtual machine comprising:
a guest operating system executing on a first virtual processor corresponding to a first thread of execution, said first virtual processor corresponding to an emulation of one processor of the multi-processor computing device, said non-transitory computer-readable instructions comprising instructions for:
issuing a startup command to a second virtual processor emulated within the virtual machine and corresponding to a second thread of execution;
providing said second virtual processor and its corresponding second thread of execution with the highest priority for utilizing hardware resources;
forcing the first virtual processor and its corresponding first thread of execution to relinquish control of at least one hardware resource and providing control to the at least one hardware resource to the second virtual processor and its corresponding second thread of execution;
in response to receiving the startup command, said second virtual processor and its corresponding second thread of execution completing a startup.

16. The computer-readable instructions of claim 15 further comprising instructions for, after said second virtual processor and its corresponding second thread of execution completing a startup, providing said second virtual processor and its corresponding second thread of execution with a priority other than the highest priority for utilizing hardware resources.

17. The computer-readable instructions of claim 15 further comprising instructions for forcing said second virtual processor and its corresponding second thread of execution to relinquish control of at least one hardware resource and providing control to same to said first virtual processor and its corresponding first thread of execution.

18. A computer-readable storage medium comprising computer-readable instructions for starting a second virtual processor in a virtual machine environment, said virtual machine environment comprising:
a guest operating system executing on said virtual machine emulated by a virtual machine monitor, said virtual machine comprising a plurality of virtual processors which are implemented as separate threads of execution, processor, said computer-readable instructions comprising instructions for:
said guest operating system executing on a first virtual processor corresponding to a first thread of execution, and said guest operating system issuing a startup command to start the second virtual processor via said first virtual processor, the second virtual processor corresponding to a second thread of execution;
said virtual machine monitor providing said second virtual processor and its corresponding second thread of execution with the highest priority for utilizing hardware resources, thereby preventing said first thread of execution corresponding to said guest operating system from continuing execution and thus preventing a timeout corresponding to said startup command;
said virtual machine monitor forcing said first virtual processor and its corresponding first thread of execution to relinquish control of a set of all hardware resources and providing control to the set of all hardware resources to said second virtual processor and its corresponding second thread of execution;
in response to receiving the startup command, said second virtual processor and its corresponding second thread of execution completing a startup;
said virtual machine monitor providing said second virtual processor and its corresponding second thread of execution with a priority other than the highest priority for utilizing hardware resources; and
said virtual machine monitor forcing said second virtual processor and its corresponding second thread of execution to relinquish control of said set of all hardware resources and providing control to said set of all hardware resources to said first virtual processor and its corresponding first thread of execution.

19. The computer-readable instructions of claim 18 further comprising instructions whereby said virtual machine monitor is a component part of a host operating system.

20. The computer-readable instructions of claim 18 further comprising instructions whereby said first thread of execution and said second thread of execution are both executed on a first physical processor.

21. The computer-readable instructions of claim 18 further comprising instructions whereby said first thread of execution is executed on a first physical processor, and said second thread of execution is executed on a second physical processor, and further comprising instructions for:
suspending execution of said first operating system substantially concurrent with the element of providing said second virtual processor and its corresponding second thread of execution with the highest priority for utilizing hardware resources; and
continuing execution of said second operating system substantially concurrent with the element of said virtual machine monitor providing said second virtual processor and its corresponding second thread of execution with a priority other than the highest priority for utilizing hardware resources.

22. A hardware control device for starting a virtual machine environment emulated by a virtual machine monitor, said virtual machine emulating a multi-processor computing device, said virtual machine comprising a guest operating system executing on a first virtual processor corresponding to a first thread of execution, said first virtual processor corresponding to an emulation of one processor of the multi-processor computing device, said hardware control device comprising:
at least one computing device coupled to at least one memory, said at least one memory storing instructions that upon execution on the at least one computing device, at least cause:
issuing a startup command to a second virtual processor instantiated emulated within the virtual machine and corresponding to a second thread of execution;
providing said second virtual processor and its corresponding second thread of execution with the highest priority for utilizing hardware resources;
forcing the first virtual processor and its corresponding first thread of execution to relinquish control of at least one hardware resource and providing control to the at least one hardware resource to the second virtual processor and its corresponding second thread of execution;
said second virtual processor and its corresponding second thread of execution completing a startup in response to the startup command.

23. The hardware control device of claim 22 further comprising means for, after said second virtual processor and its corresponding second thread of execution completing a startup, providing said second virtual processor and its corresponding second thread of execution with a priority other than the highest priority for utilizing hardware resources.

24. The hardware control device of claim 22 further comprising means for forcing said second virtual processor and its corresponding second thread of execution to relinquish control of at least one hardware resource and providing control to same to said first virtual processor and its corresponding first thread of execution.

25. A hardware control device for starting a second virtual processor in a virtual machine environment, said virtual machine environment comprising a guest operating system executing on said virtual machine emulated by a virtual machine monitor, said virtual machine comprising a plurality of virtual processors which are implemented as separate threads of execution, processor, said hardware control device comprising:

at least one computing device coupled to at least one memory, said at least one memory storing instructions that upon execution on the at least one computing device, at least cause:

said guest operating system executing on a first virtual processor corresponding to a first thread of execution, and said guest operating system issuing a startup command by way of the subsystem to start the second virtual processor via said first virtual processor, the second virtual processor corresponding to a second thread of execution;

said virtual machine monitor providing said second virtual processor and its corresponding second thread of execution with the highest priority for utilizing hardware resources, thereby preventing said first thread of execution corresponding to said guest operating system from continuing execution and thus preventing a timeout corresponding to said startup command;

said virtual machine monitor forcing said first virtual processor and its corresponding first thread of execution to relinquish control of a set of hardware resources and providing control to the set of hardware resources to said second virtual processor and its corresponding second thread of execution;

in response to receiving the startup command, said second virtual processor and its corresponding second thread of execution completing a startup;

said virtual machine monitor providing said second virtual processor and its corresponding second thread of execution with a priority other than the highest priority for utilizing hardware resources; and said virtual machine monitor forcing said second virtual processor and its corresponding second thread of execution to relinquish control of said set of hardware resources and providing control to said set of hardware resources to said first virtual processor and its corresponding first thread of execution.

26. The hardware control device of claim 25 further comprising means whereby said virtual machine monitor is a component part of a host operating system.

27. The hardware control device of claim 25 further comprising means whereby said first thread of execution and said second thread of execution are both executed on a first physical processor.

28. The hardware control device of claim 25 further comprising means whereby said first thread of execution is executed on a first physical processor, and said second thread of execution is executed on a second physical processor, said further comprising means for:

suspending execution of said first operating system substantially concurrent with the element of providing said second virtual processor and its corresponding second thread of execution with the highest priority for utilizing hardware resources; and continuing execution of said second operating system substantially concurrent with the element of said virtual machine monitor providing said second virtual processor and its corresponding second thread of execution with a priority other than the highest priority for utilizing hardware resources.

* * * * *